2,782,128

PLASTICIZED CELLULOSE ACETATE

Walter D. Paist, Berkley Heights, and Frank Berardinelli, South Orange, N. J., assignors to Celanese Corporation of America, New York, N. Y., a corporation of Delaware No Drawing. Application April 16, 1952,
Serial No. 282,701

3 Claims. (Cl. 106—177)

This invention relates to certain thermoplastic compositions and relates more particularly to thermoplastic compositions of matter comprising organic derivatives of cellulose or other thermoplastic material and containing as plasticizers certain novel chemical compounds.

The object of this invention is the provision of new thermoplastic compositions having a basis of an organic derivative of cellulose or other thermoplastic material and plasticized with plasticizers imparting fire retardant properties.

The new compounds of our invention have the following general formula:

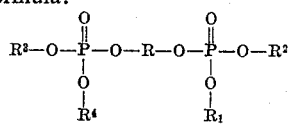

wherein R is an alkylene or monooxaalkylene radical having 2 to 10 carbon atoms, preferably 4 to 8 carbon atoms, such as tetramethylene, 3-oxa-1-5 pentylene

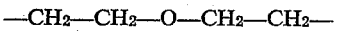

3-oxa-1,5-dimethyl-1,5-pentylene, hexamethylene, 2-ethyl hexamethylene or 2,2-diethyl trimethylene, 5-oxa-1,7-heptylene and $R^1$, $R^2$, $R^3$ and $R^4$ are alkyl radicals, which may be the same or different having 1 to 10, preferably 3 to 8 carbon atoms, such as propyl, butyl, hexyl or 2-ethyl hexyl. Specific examples of such compounds are butanediol-1,4-bis-dipropyl phosphate, diethylene glycol-bis-dipropyl phosphate, butanediol 1,4-bis-dibutyl phosphate hexanediol-2,5-bis-dipropyl phosphate and dipropylene glycol-bis-dipropyl phosphate. The esters in which R is alkylene have better water-resistance than those in which R is monooxaalkylene.

The preferred process of making the compounds of this invention involves the reaction of 2 moles of a dialkyl chlorophosphate of the formula

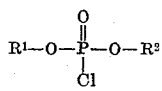

with one mole of a glycol of the formula HO—R—OH, where R is an alkylene or monooxaalkylene radical having 2 to 10 carbon atoms, preferably 4 to 8 carbon atoms, such as tetramethylene, 3-oxa-1-5 pentylene

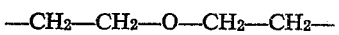

3-oxa-1,5-dimethyl-1,5-pentylene, hexamethylene, 2-ethyl hexamethylene or 2,2-diethyl trimethylene, 5-oxa-1,7-heptylene and $R^1$ and $R^2$ are alkyl radicals, which may be the same or different, having 1 to 10, preferably 3 to 8 carbon atoms, such as propyl, butyl, hexyl or 2-ethyl hexyl. Specific examples of dialkyl chlorophosphates are dipropyl chlorophosphate, diisopropyl chlorophosphate and di-(2-ethyl hexyl) chlorophosphate. Specific examples of glycols are tetramethylene glycol, diethylene glycol, 2,2-diethyl trimethylene glycol, hexamethylene glycol and 2-ethyl hexamethylene glycol.

Preferably, the reaction is carried out in the presence of an acid acceptor and mutual solvent, such as pyridine.

In making the novel plasticized compositions of our invention, the phosphate ester plasticizers may be incorporated in the thermoplastic cellulose derivative or other thermoplastic material being plasticized in amounts of from about 5 to 50 parts or more by weight for each 100 parts by weight of cellulose derivative or other plasticizable material present. When making plasticized compositions which are to be employed in molding operations, the plasticizer may be mixed with the thermoplastic compound with or without the aid of a volatile solvent in which it may be dissolved, to assist in uniformly distributing the plasticizer. Any suitable mixing device, such as a Banbury mixer, may be used to mix the plasticizer with the resin or cellulose derivative. If a solvent is employed, the latter may then be evaporated, the composition thoroughly mixed or compounded with pigments or other effect materials on hot mixing rolls, for example, and, after rolling the uniformly mixed composition out into thin sheets and cooling the same, the sheets may then be processed into molding powder.

In forming plasticized films and foils, the desired amounts of plasticizer and cellulose derivative base material or other plasticizable base material being employed are usually dissolved in a volatile solvent, or a mixture of volatile solvents, and the resulting dope or solution cast into films or foils on a suitable surface as, for example, a rotating drum, belt or wheel. The volatile solvent evaporates leaving a film or foil of the cellulose derivative base material which may then be stripped from the surface upon which it is formed and taken up in roll or other form.

Examples of compatible organic derivatives of cellulose which may be plasticized with the new phosphate esters are cellulose esters such as cellulose nitrate, cellulose acetate, cellulose propionate, cellulose butyrate, cellulose acetate-propionate and cellulose acetate butyrate as well as cellulose ethers such as ethyl cellulose and benzyl cellulose.

Other compatible thermoplastic materials, such as vinyl resins, may be plasticized with the phosphate plasticizers of our invention.

In order further to illustrate our invention, but without being limited thereto, the following examples are given:

Example I (a) The intermediate, dipropyl chlorophosphate, was prepared as follows:

412.2 parts by weight (3 moles) of $PCl_3$ were added gradually, with rapid stirring, to 551.7 parts by weight (9 moles+2% excess) of n-propyl alcohol over a period of 30 minutes with the temperature maintained between 8 and 11° C. by means of a Dry Ice-trichlorethylene bath. The reaction mixture was stirred for an additional 30 minutes at 10° C., and then chlorinated, by the introduction of chlorine, with stirring, under a reduced pressure of 140–80 mm. at 8–10° C. Introduction of gaseous chlorine was continued until the reaction mixture assumed a yellow coloration and a temperature drop was noted. Residual HCl was removed by adding 878 parts by weight of benzene to the cold reaction mixture immediately after chlorination, reducing the pressure to 100–70 mm. and maintaining the temperature between 10 and 5° C. for ¾ hour, with stirring, thereafter heating to gradually raise the liquid temperature to 48° C. at 70–80 mm. pressure over a period of 1½ hours thus distilling off practically all the benzene. The product was distilled at 3 mm. pressure to obtain a yield of 573.1 parts by weight (95% of theoretical yield) of dipropylchlorophosphate having a refractive index $N_d^{25}$ of 1.4238.

(b) 10.6 parts by weight (0.1 mole) of diethylene glycol dissolved in 35 parts by weight of pyridine was added dropwise to 40.1 parts by weight (0.2 mole) of dipropylchlorophosphate, prepared as described above, with stirring at −3 to −5° C. The reaction mixture was maintaned between 0 and −5° C. for 1 hour and the temperature was then permitted to rise to 20° C. over a period of 25 minutes. 107 parts by weight of ethyl ether was added and the mixture refluxed for one hour. After cooling to 0° C., pyridine hydrochloride, formed in the reaction was filtered off; the weight of the pyridine hydrochloride, after it was dried at 3 hours at 60–70° C. under a vacuum of 26 inches, was 22.8 parts by weight. The ether filtrate was washed with aqueous hydrochloric acid of about 6% concentration until free of pyridine, washed alkaline with a 10% aqueous solution of sodium carbonate and finally washed neutral with water. Upon evaporation of solvent followed by heating at 100° C. at 1 mm. pressure, there was obtained 33.8 parts by weight of a colorless liquid product which had a refractive index $N_d^{25}$ of 1.4349 and a specific gravity 25/25° C. of 1.1176. This material was an extremely active solvent for cellulose acetate.

*Example II*

100 parts by weight of plastic grade cellulose acetate was thoroughly mixed with 30 parts by weight of diethylene glycol-bisdipropyl phosphate, and a pressed disc was prepared by molding this mixture at 200° C. for 15 minutes. The resulting disc was transparent and light colored. It has a Rockwell hardness of 92. Attempts were made to burn this disc and it was found to have good fire retarding properties.

*Example III*

95.4 parts by weight (1.06 moles) of butanediol-1,4 was dissolved in 378 parts by weight of pyridine and the resulting solution was added dropwise to 425 parts by weight (2.12 moles) of dipropyl chlorophosphate, produced according to the method of Example I (a), with stirring at −5° to 0° C. The reaction mixture was maintained at between −3° and 0° C. for one hour and then the temperature was permitted to rise gradually to 15° C. over a period of 40 minutes. 1067 parts by weight of ethyl ether was then added and the mixture refluxed for one hour. After cooling to 0° C. pyridine hydrochloride was filtered off; the weight of this pyridine hydrochloride, after drying for 3 hours at 65–70° C. under 26 inches of vacuum, was 242 parts by weight. The ether filtrate was washed with aqueous hydrochloric acid of about 6% concentration until free of pyridine, washed alkaline with a 10% aqueous solution of sodium carbonate and finally washed neutral with water. Upon evaporation of the solvent and drying by heating to 100° C. at 1 mm., 406.7 parts by weight of the butanediol-1,4-bis-dipropyl phosphate was obtained as a colorless liquid of refractive index $N_d^{25}$ of 1.4347 and specific gravity 25/25° C. of 1.0931. It was a very active solvent for cellulose acetate.

The butanediol 1,4-bis dipropyl phosphate has a solubility in water of only 0.4% by weight at 28–29° C. The diethylene glycol bis-dipropyl phosphate has a solubility in water of 1.5% by weight. The solubility in water was determined by the method of Fordyce and Meyer, Industrial & Engineering Chemistry 32, 1059 (1940).

*Example IV*

100 parts by weight of plastic grade cellulose acetate was thoroughly mixed with 25 parts by weight of butanediol-1,4-bis dipropyl phosphate. The mixture was molded into a disc at 200° C. for 15 minutes. The resulting disc was clear, had good hardness and impact strength and had good fire resistance. The disc had less water-sensitivity than a corresponding disc made with diethylene glycol bis-dipropyl phosphate.

It is to be understood that the foregoing detailed description is given merely by way of illustration that that many variations may be made therein without departing from the spirit of our invention.

Having described our invention, what we desire to secure by Letters Patent is:

1. A composition of matter comprising cellulose acetate plasticized with

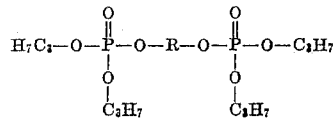

in which R is selected from the group consisting of alkylene and alkyleneoxyalkylene radicals having 4 to 8 carbon atoms.

2. A composition of matter comprising cellulose acetate plasticized with diethylene glycol-bis-dipropyl phosphate.

3. A composition of matter comprising cellulose acetate plasticized with butanediol-1,4-bis-dipropyl phosphate.

References Cited in the file of this patent

UNITED STATES PATENTS

| | | |
|---|---|---|
| 1,944,530 | Schonburg | Jan. 23, 1934 |
| 2,021,901 | Smith | Nov. 26, 1935 |
| 2,228,222 | Bass | Jan. 7, 1941 |
| 2,574,517 | Walter | Nov. 13, 1951 |

OTHER REFERENCES

Oliver et al.: "Jour. of Ind. & Eng. Chem." 42, pages 488 to 491.

Simonds & Ellis Handbook of Plastics (1943), pp. 252 to 271.